Aug. 16, 1949.   S. E. NEWHOUSE   2,479,397
TRACTION MOTOR BRAKING SYSTEM
Filed April 21, 1945                                   2 Sheets-Sheet 1

WITNESSES:

INVENTOR
Simeon E. Newhouse.
BY
ATTORNEY

Aug. 16, 1949.  S. E. NEWHOUSE  2,479,397
TRACTION MOTOR BRAKING SYSTEM
Filed April 21, 1945  2 Sheets-Sheet 2
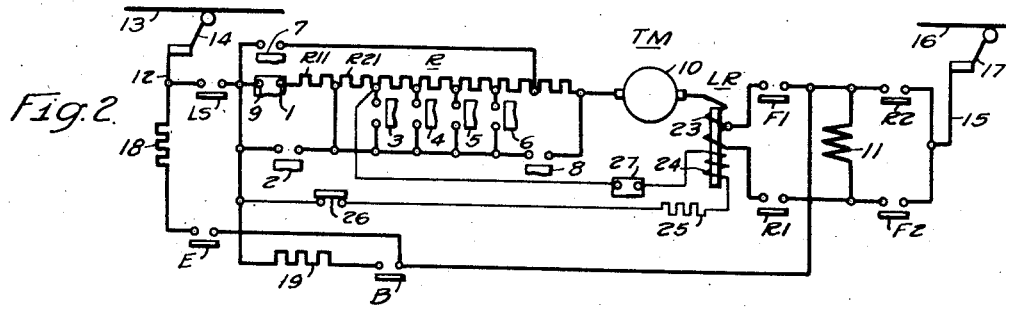
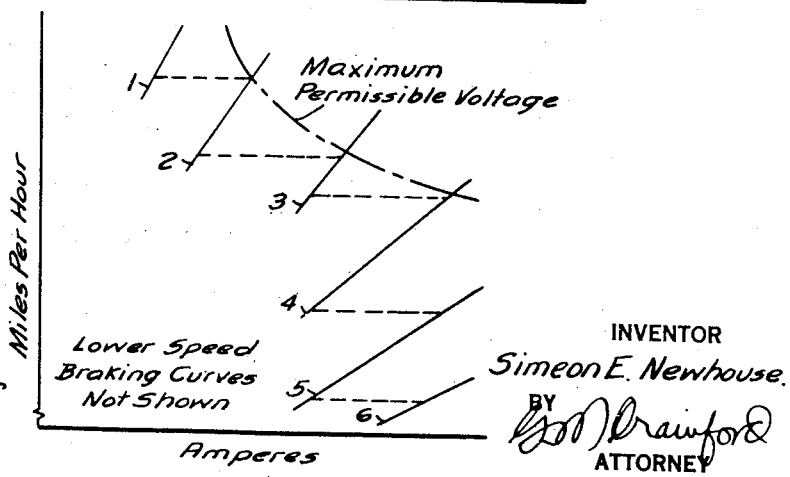
INVENTOR
Simeon E. Newhouse.
ATTORNEY Patented Aug. 16, 1949

2,479,397

UNITED STATES PATENT OFFICE 2,479,397

TRACTION MOTOR BRAKING SYSTEM

Simeon E. Newhouse, Edgewood, Pa., assignor to Westinghouse Electric Corporation, East Pittsburgh, Pa., a corporation of Pennsylvania Application April 21, 1945, Serial No. 589,474

5 Claims. (Cl. 318—365)

My invention relates, generally, to control systems, and more particularly, to systems for controlling the operation of electrically propelled vehicles, such as trolley coaches.

The maximum permissible voltage for the propelling motor of a vehicle while operating as a generator during dynamic braking must be taken into account when devising the control system for the motor. The setting of the current limit relay must be such that the peak swings of current do not create a voltage exceeding the maximum which is permissible for the motor. Thus, at high speeds, the setting of the current limit relay will be much below that which would be satisfactory at intermediate and low speeds.

The usual practice has been to provide a shunt coil on the limit relay which aids the series coil and lowers the current setting of the relay. Heretofore, the shunt coil has been so connected that its effect gradually decreases as the vehicle slows down. Thus, the setting of the limit relay does not change rapidly from one braking curve to the next and the available dynamic braking capacity is not fully utilized at intermediate speeds.

An object of my invention, generally stated, is to provide a dynamic braking system which shall be simple and efficient in operation, and which may be economically manufactured and installed.

A more specific object of my invention is to limit the voltage of a motor during dynamic braking.

Another object of my invention is to provide for automatically changing the setting of a current limit relay during dynamic braking.

Other objects of my invention will be explained fully hereinafter or will be apparent to those skilled in the art.

According to one embodiment of my invention, the current limit relay in a control system is provided with a shunt coil which is connected through interlocks across the first few steps of the main resistor which controls the motor current during dynamic braking. The setting of the limit relay is automatically changed abruptly as the resistor steps are shunted from the dynamic braking circuit, thereby enabling the motor voltage limitation to be followed closely.

For a fuller understanding of the nature and objects of the invention, reference may be had to the following detailed description, taken in conjunction with the accompanying drawings in which:

Fig. 2 is a schematic diagram of the main circuits shown in Fig. 1;

Figs. 3 and 4 are charts showing the sequence of operation of the apparatus illustrated in Figs. 1 and 2; and Fig. 5 is a set of braking curves for a typical traction motor illustrating the principles of the invention.

Figure 1:
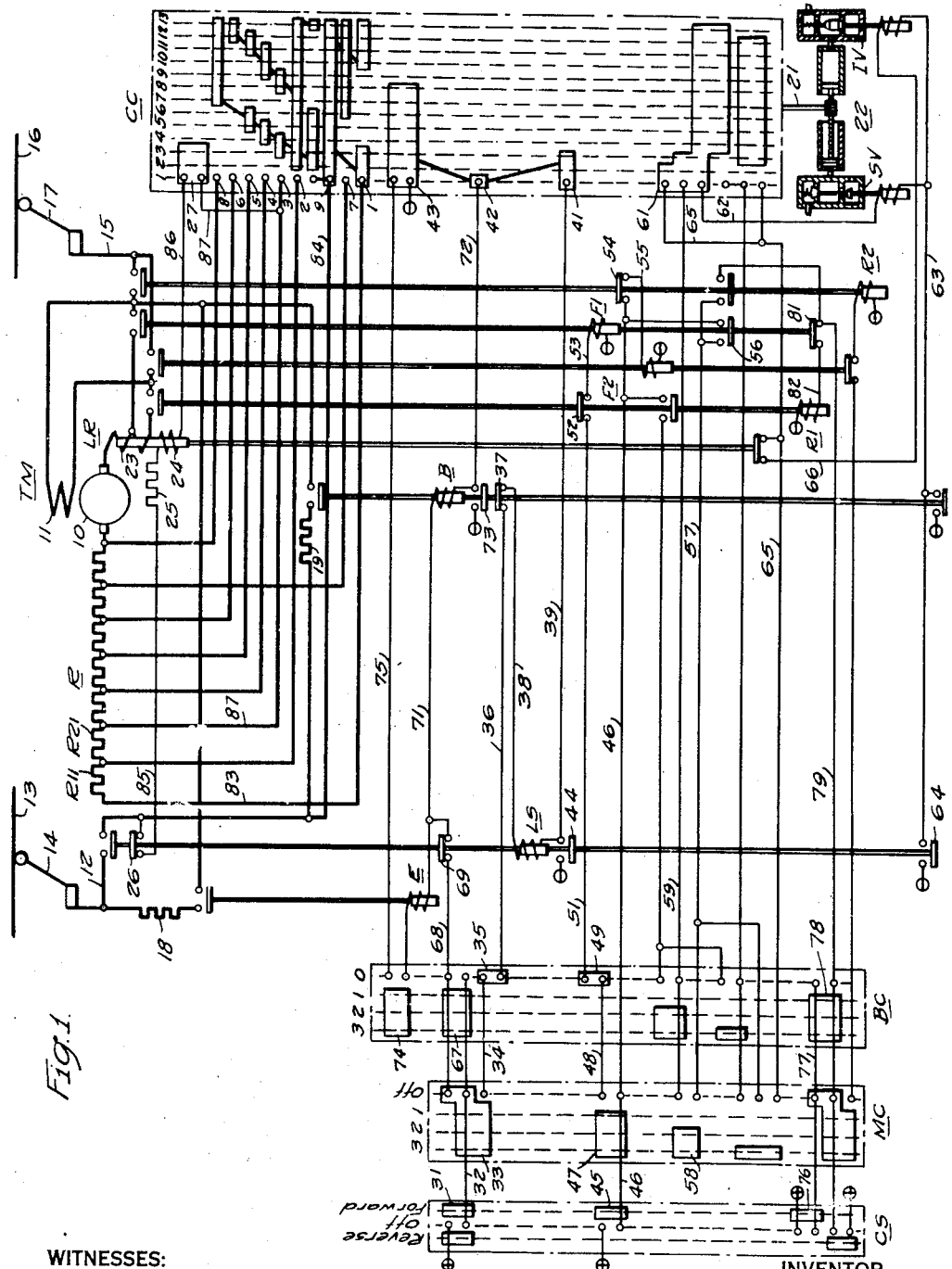
Figure 1 is a diagrammatic view of a control system embodying my invention.

Referring to the drawings, and particularly to Fig. 1, the system shown therein comprises a traction motor TM having an armature winding 10 and a series field winding 11; a line switch LS for connecting the motor TM to a power conductor 12 which may be energized from a trolley conductor 13 through a current collecting device 14; a plurality of reversing switches F1, F2, R1 and R2 for controlling the direction of operation of the motor TM and also connecting the motor to a power conductor 15 which is connected to a trolley conductor 16 through a current collecting device 17; a switch B which cooperates with certain of the reversing switches to establish dynamic braking connections for the motor TM as described in detail in the copending application of L. G. Riley, Serial No. 508,265, filed October 29, 1943 now Patent 2,456,892, issued December 21, 1948; and a switch E which connects the field winding 11 of the motor TM to the power conductor 12, thereby exciting the motor field during dynamic braking. A resistor 18 is connected in the excitation circuit for the field winding 11 and a resistor 19 is connected in the dynamic braking circuit for the motor TM.

The motor current is controlled both during acceleration and dynamic braking by a resistor R which is shunted from the motor circuit step-by-step by a controller CC which is provided with a plurality of contact members 1 to 8, inclusive, for shunting the resistor R. The controller CC may be of the cam or the drum type having a shaft 21 which is driven by an air engine 22 of a type well known in the art.

The air engine 22 is provided with a standard magnet valve SV and an inverted magnet valve IV. The operation of the air engine is automatically controlled during both acceleration and dynamic braking by a current limit relay LR having a series coil 23 which is connected in the motor circuit and is, therefore, responsive to the motor current during both acceleration and dynamic braking. The series coil 23 is divided into two sections, only one of which is utilized during acceleration and both of which are utilized during dynamic braking, thereby changing the calibration of the relay LR during braking.

In order to provide for changing the calibration of the limit relay LR still further during dynamic braking to prevent the maximum permissible voltage for the motor from being exceeded when the vehicle is operating at high speeds, the relay LR is also provided with a shunt coil 24. As shown, the shunt coil 24 is connected across two steps of the resistor R through a resistor 25 and contact members 26 on the line switch LS and 27 on the controller CC. These are the first two steps which are shunted from the motor circuit during dynamic braking. It will be understood that the coil 24 may be connected across one or more additional steps of the resistor R if desired.

As illustrated by the braking curves shown in Fig. 5, which are typical curves for a traction motor, by proper adjustment of the resistor 25 a limit setting of 85 amperes, for example, can be obtained on the first braking curve. When R11, the first section of the main resistor R, is shunted, the limit setting will automatically increase to around 120 amperes because of the reduced voltage across the shunt coil 24 of the limit relay LR. When the second main resistor section R21 is shunted the shunt coil 24 of the limit relay becomes ineffective, since there is no longer any voltage applied to this coil, and the setting of the limit relay is established at about 200 amperes for the remaining notches 3, 4, 5, 6, etc.

It will be noted from the curve that the maximum permissible voltage is not exceeded at any time. In this manner, the setting of the limit relay LR is such that the maximum permissible voltage is not exceeded when the vehicle is operating at high speeds and the full braking rate is made available at intermediate speeds. Thus, the setting of the limit relay is abruptly changed during the first few notches, which permits the maximum permissible motor voltage to be followed closely.

Manually operable controllers CS and MC are provided for controlling the operation of the reversing switches and the line switch LS, and for controlling the supply of control current to the air engine 22. The controller MC controls the operation of the control apparatus during acceleration, and a controller BC controls the operation of the apparatus during dynamic braking. The controllers MC and BC are interlocked in the usual manner to prevent improper operation of the equipment in the event that both the controllers are operated simultaneously.

In order that the function of the foregoing apparatus may be more clearly understood, the operation of the system will now be described in more detail. Assuming that it is desired to accelerate the vehicle in a forward direction, the control switch CS is actuated to the forward position and the controller MC is actuated to position 1. At this time, an energizing circuit is established for the actuating coil of the line switch LS, which may be traced from positive through a contact segment 31 on the control switch CS, conductor 32, a segment 33 on the controller MC, conductor 34, a segment 35 on the controller BC, conductor 36, an interlock 37 on the switch B, conductor 38, the actuating coil of the switch LS, conductor 39 and contact members 41, 42 and 43 on the controller CC to negative. A holding circuit is established for the line switch LS through an interlock 44 on the switch LS.

At this time, the reversing switches F1 and F2 are also closed. The energizing circuit for the switch F1 extends from positive through a contact segment 45 on the switch CS, conductor 46, a segment 47 on the switch MC, conductor 48, a segment 49 on the switch BC, conductor 51, an interlock 52 on the switch R1, conductor 53 and the actuating coil of the switch F1 to negative. The energizing circuit for the switch F2 extends from the conductor 46 through an interlock 54 on the switch R2, conductor 55 and the actuating coil of the switch F2 to negative.

The closing of the switches LS, F1 and F2 connects the traction motor TM across the power conductors 12 and 15 in series-circuit relation with the resistor R. The air engine 22 may be operated to shunt the resistor R from the motor circuit step-by-step by actuating the controller MC to positions 2 and 3.

When the controller MC is in position 2, the magnet valve SV is energized through a circuit which extends from the conductor 46 through an interlock 56 on the switch F1, conductor 57, a segment 58 on the controller MC, conductor 59, a segment 61 on the controller CC, conductor 62, the coil of the magnet valve SV, conductor 63 and an interlock 64 on the line switch LS to negative. The magnet valve IV is also energized at this time through a circuit which extends from the conductor 59 through the segment 61 on the controller CC, conductor 65, the contact members of the relay LR, conductor 66, the actuating coil of the magnet valve IV, conductor 63 and the interlock 64 to negative.

As explained hereinbefore, the operation of the air engine 22 is under the control of the limit relay LR. Thus, when the motor current exceeds a predetermined amount, the contact members of the relay LR are opened to deenergize the magnet valve IV, thereby stopping the progression of the controller CC. The operator of the vehicle may also stop the progression of the controller CC by holding the controller MC in position 2, thereby stopping the controller CC at a certain point in its travel. The operation of the controller CC may be resumed by actuating the controller MC to position 3.

If it is desired to decelerate the vehicle, the controller MC is actuated to the "off" position, and the controller BC is actuated to one of the braking positions. When the controller MC is returned to the "off" position, the switches LS and F1 are opened to disconnect the motor from the power circuit. Also the magnet valves of the air engine 22 are deenergized, thereby causing the controller CC to be returned to position 1.

When the controller BC is actuated to position 1, the switches B, E and R1 are closed to establish a dynamic braking circuit for the motor TM. The energizing circuit for the switch B may be traced from positive through the segment 31 on the switch CS, conductor 32, a segment 67 on the controller BC, conductor 68, an interlock 69 on the switch LS, conductor 71, the actuating coil of the switch B, conductor 72 and contact segments 42 and 43 on the controller CC to negative. A holding circuit for the switch B is established through an interlock 73 on the switch B.

The energizing circuit for the switch E extends from the conductor 71 through the coil of the switch E, a contact segment 74 on the controller BC, conductor 75 and the segment 43 on the controller CC to negative. The energizing circuit for the switch R1 extends from positive through a segment 76 on the switch CS, conductor 77, a segment 78 on the controller BC, conductor 79, an interlock 81 on the switch F1, conductor 82 and the actuating coil of the switch R1 to negative.

As shown in Figs. 1 and 2, the closing of the switches B and R1 establishes a dynamic braking circuit for the motor TM through the resistors R and 19. This dynamic braking circuit includes the series field winding 11 and both sections of the series coil 23 of the relay LR. The field winding 11 is also connected across the power conductors 12 and 15 through the switches E and F2, thereby separately exciting the field winding 11 and ensuring a prompt building up of the dynamic braking effect.

At this time, the shunt coil 24 of the limit relay LR is connected across the first two steps of the resistor R through a circuit which extends from one terminal of the resistor section R11 through conductor 83, contact members 1 and 9 of the controller CC, conductor 84, the interlock 26 on the switch LS, conductor 85, the resistor 25, the shunt coil 24, conductor 86, the contact members 27 on the controller CC and conductor 87 to the one terminal of the resistor section R21.

Thus, the shunt coil 24 is responsive to the voltage-drop across the resistor sections R11 and R21. The coil 24 is so disposed on the relay LR that it aids the series coil 23, thereby lowering the current setting of the relay which causes the relay to operate at a lower current value. In this manner, the braking current is kept at a low value during the first few steps of braking while the vehicle is operating at a high speed. The reduced current reduces the excitation of the motor, which is functioning as a generator, thereby keeping the motor voltage below the maximum permissible voltage.

The controller CC is operated in a manner similar to that during acceleration to shunt the resistor R from the motor circuit step-by-step during dynamic braking. The operation of the controller CC is under the control of the limit relay LR which functions to prevent the motor current from increasing beyond the setting of the relay. Thus, while the vehicle is operating at a high speed, the resistor sections R11 and R21 are kept in the motor circuit to prevent an excessive amount of current from flowing.

After the resistor sections R11 and R21 are shunted from the circuit, the shunt coil 24 is no longer effective and the setting of the relay LR is increased to the normal setting suitable for operation at moderate speeds of the vehicle. The controller CC is advanced in the usual manner to continue the shunting of the resistor R from the motor circuit.

From the foregoing description, it is apparent that I have provided for automatically changing the setting of a current limit relay in a motor control system during dynamic braking of a vehicle, thereby permitting the motor voltage to follow closely the maximum permissible voltage without exceeding the maximum voltage. While the present system is particularly suitable for utilization on trolley coaches and street cars, it is not necessarily limited thereto and may be utilized on other vehicles or for other applications involving dynamic braking.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system, in combination, a motor, means for establishing a dynamic braking circuit for the motor, a resistor connected in the dynamic braking circuit for controlling the motor current, means for shunting said resistor step-by-step, and relay means responsive jointly to the motor current and the voltage drop across that portion only of said resistor which is effective for less than half of the resistor steps for controlling the operation of said resistor shunting means.

2. In a control system, in combination, a motor, means for establishing a dynamic braking circuit for the motor, a resistor connected in the dynamic braking circuit for controlling the motor current, means for shunting said resistor step-by-step, and relay means responsive jointly to the motor current and the effective voltage drop across less than half the steps of said resistor for controlling the operation of said resistor shunting means.

3. In a control system, in combination, a motor, means for establishing a dynamic braking circuit for the motor, a resistor connected in the dynamic braking circuit for controlling the motor current, means for shunting said resistor step-by-step, a relay responsive to the motor current for controlling the operation of said resistor shunting means, and calibrating means responsive to the voltage drop across that portion only of said resistor which is effective for less than half of the resistor steps for changing the current setting of said relay.

4. In a control system, in combination, a motor, means for establishing a dynamic braking circuit for the motor, a resistor connected in the dynamic braking circuit for controlling the motor current, means for shunting said resistor step-by-step, a relay responsive to the motor current for controlling the operation of said resistor shunting means, and calibrating means responsive to the change in the voltage drop across less than half the steps of said resistor caused by the shunting of said resistor for changing the current setting of said relay.

5. In a control system, in combination, a motor, means for establishing a dynamic braking circuit for the motor, a resistor connected in the dynamic braking circuit for controlling the motor current, means for shunting said resistor step-by-step, a relay responsive to the motor current for controlling the operation of said resistor shunting means, calibrating means responsive to the change in the voltage drop across less than half the steps of said resistor caused by the shunting of said resistor for changing the current setting of said relay, and means actuated by said resistor shunting means for controlling the energization of said calibrating means.

SIMEON E. NEWHOUSE.

REFERENCES CITED

The following references are of record in the file of this patent:

UNITED STATES PATENTS

| Number | Name | Date |
| --- | --- | --- |
| 2,046,970 | Royer | July 7, 1936 |